Patented Oct. 26, 1943

2,332,778

UNITED STATES PATENT OFFICE 2,332,778

PREPARATION OF CHLOR-ISO-OLEFINS

Hyym E. Buc and Clifford W. Muessig, Roselle, N. J., assignors to Standard Oil Development Company, a corporation of Delaware No Drawing. Application August 2, 1941, Serial No. 405,196

3 Claims. (Cl. 260—654)

This invention relates to an improved process for the preparation of allyl type chlor-isoolefins from 2-methyl-2,3-dichlorbutane.

A further object of this invention is an improved process for the preparation of desired types of halo-olefins, especially the allyl type, in large yield from isopentane dihalides.

Other and further objects will be apparent from the following description and claims.

It has now been found that the isopentane dihalide, 2-methyl-2,3-dichlorbutane, may be readily converted into allyl type chlor-isoolefins by heating under controlled conditions, so as to avoid the formation of substantial amounts of diolefins. The reaction is conducted, for example, by passing the isopentane dihalide through a reaction zone heated to a temperature of about 400 to 500° C., preferably at about 420 to 450° C., the time of exposure to this temperature being sufficient only for about 50% to 70% decomposition of the dihalide and being preferably about one second. The reaction may be conducted at either elevated or reduced pressures, although atmospheric pressure is generally preferred. The reaction tubes may be constructed of, or lined with quartz or glass or metals which do not react with HCl under the conditions of the process. Catalytically acting substances, especially salts and metals which react with HCl should be excluded from contact with the materials in the reaction zone. Metal salts are particularly objectionable since they tend to dehydrohalogenate the desired mono-halo-olefins and also cause coke formation. The reaction products are then quickly cooled, by being passed through a condenser, or by direct contact with a cooling liquid, such as water, or hydrocarbon oils or other substantially inert liquid solvents for one or more of the reaction products. There are thus obtained two chlor-isoolefins, 2-methyl-3-chlorbutene-1, boiling point 94° C., an allyl type chlorolefin having the formula (1) 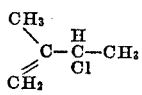

and 1-chlor-2-methyl butene-2, boiling point 107–108° C., also an allyl type chlorolefin having the formula (2) 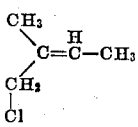

These products may readily be separated by distillation, as there is very little rearrangement at their distillation temperatures. However, rearrangement does occur at higher temperatures, and thus the yield of either product may be increased by repassing the other through the reaction zone, either alone or in admixture with additional 2-methyl-2,3-dichlorbutane.

The following example is presented to describe suitable methods for converting 2-methyl-2,3-dichlorbutane to the chlor-isoolefins, and is intended solely as an illustration of this invention and not in limitation thereof.

Example 2-methyl-2,3-dichlorbutane, boiling at 129° C. and having the formula (3) 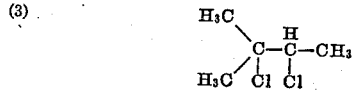

is vaporized and passed through a quartz tube heated to 420 to 450° C. at such a rate that the time of exposure to this temperature is about one second, the reaction products leaving this tube being immediately cooled by passing through a condenser. The condensate consists almost entirely of the unreacted dichlor pentane (3) in a proportion of about 30 to 50% (molal base on the initial feed (3)) and the two monochlor isopentenes (1) and (2), in a ratio of about 2.5:1. These products may be separately recovered by distillation of the total product.

The proportion of either monochlor isopentene in this product may be increased by recycling the other monochlor isopentene to the dehydrochlorination reaction. For example, the product (2) may be recycled and the yield of the product (1) thus increased. Both of these monochlor isopentenes can be further dehydrochlorinated to form isoprene.

Other halo-isoolefins may also be prepared according to this invention by dehydrohalogenation of the corresponding 2-methyl-2,3-dihalobutane; for example, the allyl type brom-isoolefins may be prepared by dehydrobromination of 2-methyl-2,3-dibrombutane.

The mono-halo-isoolefins produced by this process are very reactive compounds. They have both a double bond and a reactive halogen atom, and thus can be used as intermediates for the preparation of many valuable derivatives, in addition to their value as a source of diolefins that can be formed by dehydrohalogenation.

This invention is not to be limited by any examples or specific embodiments presented herein.

all such being intended solely for purpose of illustration, as it is desired to claim this invention as broadly as the prior art permits.

We claim:

1. Process for the preparation of chlor-isoolefins comprising subjecting 2-methyl-2,3-dichlorbutane to thermal dehydrochlorination at a temperature of about 400 to 500° C. for a time sufficient to split off approximately one molecule of HCl but insufficient to cause materially more than one molecule of HCl to be split off.

2. Process for the preparation of chlor-isoolefins comprising subjecting 2-methyl-2,3-dichlorbutane to thermal dehydrochlorination at a temperature of about 420 to 450° C. and a time of exposure to said temperature of about one second.

3. Process for preparing the chlor-isoolefins, 2-methyl-3-chlorbutene-1 and 1-chlor-2-methyl butene-2, comprising subjecting 2-methyl-2,3-dichlorbutane to thermal dehydrochlorination in a reaction zone maintained at about 420 to 450° C. at sufficient rate to provide a reaction time of about one second, then quickly cooling the reaction products substantially below the reaction temperature.

HYYM E. BUC.
CLIFFORD W. MUESSIG.